United States Patent [19]

Sakowski

[11] 4,196,184
[45] Apr. 1, 1980

[54] LIME RECOVERY PROCESS

[75] Inventor: Walter J. Sakowski, Cleveland, Tenn.

[73] Assignee: Olin Corporation, New Haven, Conn.

[21] Appl. No.: 919,514

[22] Filed: Jun. 27, 1978

Related U.S. Application Data

[63] Continuation-in-part of Ser. No. 590,230, Jun. 25, 1975, abandoned, which is a continuation-in-part of Ser. No. 340,121, Mar. 12, 1973, Pat. No. 3,895,099, which is a continuation-in-part of Ser. No. 257,768, May 30, 1972, abandoned.

[51] Int. Cl.$^2$ .................... C01F 11/02; C04B 1/00
[52] U.S. Cl. .............................. 423/639; 423/474
[58] Field of Search ............... 423/158, 163, 164, 474, 423/639

[56] References Cited

U.S. PATENT DOCUMENTS

| | | | |
|---|---|---|---|
| 2,374,835 | 5/1945 | Robson | 423/474 |
| 3,094,380 | 6/1963 | Bruce | 423/474 |
| 3,572,989 | 3/1971 | Tartara | 423/474 |
| 3,895,099 | 7/1975 | Sakowski | 423/474 |

FOREIGN PATENT DOCUMENTS

2628062  1/1977  Fed. Rep. of Germany .
7307539 12/1973  Netherlands ........................ 423/474

Primary Examiner—O. R. Vertiz
Assistant Examiner—Wayne A. Langel
Attorney, Agent, or Firm—Donald F. Clements; James B. Haglind

[57] ABSTRACT

An improved process for precipitating and recovering lime by reacting an aqueous solution of calcium hypochlorite with an alkaline compound is described. The pH of the resulting lime slurry is maintained in the range from about 11 to about 13.0, whereby hemi-basic calcium hypochlorite crystals form in the slurry. When the slurry is filtered or otherwise separated to recover the lime, an improved filtration rate is obtained. In addition, washing of the lime cake to remove impurities such as sodium chloride is easily accomplished because of the ease of separating wash water in the presence of the hemi-basic calcium hypochlorite crystals.

19 Claims, 2 Drawing Figures

LIME RECOVERY PROCESS

This application is a continuation-in-part of U.S. Ser. No. 590,230, filed June 25, 1975, now abandoned, which is a continuation-in-part of U.S. Ser. No. 340,121, filed Mar. 12, 1973, now U.S. Pat. No. 3,885,099, issued July 15, 1975, which was a continuation-in-part of U.S. Ser. No. 257,768, filed May 30, 1972, now abandoned.

This invention relates to the recovery of lime from calcium hypochlorite solutions.

A variety of processes and modifications are known in the art for manufacturing calcium hypochlorite.

U.S. Pat. No. 1,713,669, issued to Robert B. MacMullin et al on May 21, 1929, discloses a process in which an aqueous slurry of lime is chlorinated, solid impurities are removed, and caustic and chlorine are added to produce calcium hypochlorite and alkali chloride. The concentration of the calcium hypochlorite-alkali chloride mixture is kept dilute so that the alkali chloride remains in solution while the calcium hypochlorite dihydrate is precipitated. After separation of the solid calcium hypochlorite dihydrate, the filtrate may be treated with lime to form basic calcium hypochlorite or used as bleach liquor.

U.S. Pat. No. 1,718,284, issued to Anthony George et al on June 25, 1929, describes a process in which lime and caustic soda are added to an eutectic solution of sodium chloride and calcium hypochlorite, the mixture is chlorinated and sodium chloride is quickly precipitated and separated from an unstable solution of calcium hypochlorite. Calcium hypochlorite dihydrate is then precipitated. In an alternate embodiment, sodium hypochlorite and lime are chlorinated in an eutectic solution of sodium chloride and calcium hypochlorite with the sodium chloride and calcium hypochlorite dihydrate being precipitated and separated sequentially as described above.

U.S. Pat. No. 1,718,285, issued to Anthony George on June 25, 1929, discloses a process for chlorinating an aqueous slurry of lime in the presence of a solution of sodium hypochlorite to form a slurry of calcium hypochlorite dihydrate. The slurry is evaporated to dryness to recover calcium hypochlorite, or alternatively the calcium hypochlorite is precipitated from a dilute NaCl solution, then separated and dried.

A process of calcium hypochlorite dihydrate manufacture is disclosed in U.S. Pat. No. 3,572,989, issued to Seiji Tatara et al on Mar. 30, 1971, in which concentrated sodium hydroxide to added to an aqueous solution saturated with calcium hypochlorite and sodium chloride, and in a first step, the mixture is chlorinated and sodium chloride crystals are removed. In a second step, slaked lime and water are added to the reaction mixture and the mixture is chlorinated. The resulting calcium hypochlorite dihydrate crystals are separated, and the mother liquor is recycled to the first step.

In all of the above processes the separation of calcium hypochlorite from sodium chloride takes place by either (a) precipitating sodium chloride from a metestable solution of calcium hypochlorite where the separation must be carried out quickly to be effective, or (b) precipitating calcium hypochlorite dihydrate from sodium chloride in solutions which must be very dilute to hold the sodium chloride in solution.

In both (a) and (b) above, there is a loss of product by co-precipitation or incomplete precipitation and in (b) above there is the necessity to treat or dispose of large volumes of a dilute sodium chloride solution containing calcium hypochlorite values.

The process described in the above-identified parent U.S. Pat. No. 3,895,099 describes another process for preparing calcium hypochlorite wherein the filtrate, after removal of calcium hypochlorite dihydrate crystals is reacted with an alkali metal hydroxide to form a lime slurry, the lime is separated and recycled to the calcium hypochlorite reactor. Although this technique permits the recovery of calcium values which are normally lost in the previously defined calcium hypochlorite processes, one of the problems encountered is the difficulty in separating the lime particles from the resulting lime slurry.

There is a need in the art at the present time to improve the recovery of calcium values in calcium hypochlorite processes and to improve the separation rate of lime from lime slurry formed in an effort to recover calcium values.

It is a primary object of this invention to provide an improved process for separating lime from lime slurry.

Another object of this invention is to provide an improved process for preparing calcium hypochlorite from lime, alkali metal hydroxide and chlorine.

A further object of this invention is to provide an improved process for preparing calcium hypochlorite wherein the proportion of impurities in waste streams is substantially reduced.

These and other objects of the invention are accomplished in a process for precipitating lime in a reaction of an alkali metal hydroxide with an aqueous solution of calcium hypochlorite to form a lime slurry, and separating the lime from the resulting slurry, utilizing an improvement which comprises maintaining a pH in the range from about 11.5 to about 13.0 during said reaction, whereby hemi-basic calcium hypochlorite crystals form in said lime slurry and aid in the separation of the lime from the slurry. In addition, washing of the lime particles to remove impurities is easily effected because of the improved contact between wash liquor and lime particles and ease of separation of wash liquor from the lime particles that is effected by the presence of hemi-basic calcium hypochlorite crystals in the lime particles.

More in detail, any aqueous solution containing calcium hypochlorite may be processed in accordance with the process of this invention. Filtrates processed in calcium hypochlorite processes after separation of the calcium hypochlorite product, are particularly useful as a starting material in the process of this invention. Generally, these filtrates are aqueous solutions containing soluble calcium hypochlorite values as well as reaction by-products such as sodium chloride and sodium hypochlorite, or calcium chloride. A typical filtrate obtained in commercial calcium hypochlorite processes will have the following analyses:

| Components | Percent by Weight | |
| --- | --- | --- |
| | Broad Range | Narrow Range |
| Calcium hypochlorite | 5–12 | 9.5–10.5 |
| Sodium hypochlorite | 0–3.0 | 0–0.5 |
| Sodium chloride | 16–20 | 17–18 |
| Calcium chloride | 0–2 | 0–0.5 |
| Water | 68–75 | 69–73 |

While the above analysis is a typical analysis of a starting calcium hypochlorite solution, it will be recognized by those skilled in the art that the composition of the calcium hypochlorite filtrate will depend upon the type of process employed in the preparation of calcium hypochlorite. For example, in some commercial processes, sodium chloride is separated as a solid before calcium hypochlorite is separated, and the resulting filtrate will contain substantially less sodium chloride. In other processes, no sodium components are employed and the main impurity is calcium chloride rather than sodium chloride. In the calcium systems, a typical filtrate may have the following analysis.

| Components | Percent by Weight | |
|---|---|---|
| | Broad Range | Narrow Range |
| Calcium hypochlorite | 1–10 | 1–8 |
| Calcium chloride | 15–40 | 18–35 |
| Calcium hydroxide | 0.1–1.0 | 0.4–0.6 |
| Water | 50–85 | 60–80 |

The benefits of applicant's improved process are also applicable to such filtrates.

Any alkaline compound capable of precipitating calcium values as lime from the aqueous solution of calcium hypochlorite may be employed in this process. Typical examples of alkaline compounds are alkali metal hydroxides such as sodium hydroxide, potassium hydroxide, lithium hydroxide and mixtures thereof. However, other suitable alkaline hydroxides include barium hydroxide, cesium hydroxide, rubidium hydroxide and strontium hydroxide.

Sufficient alkaline hydroxide is added to the aqueous solution of calcium hypochlorite to adjust the pH to a range from about 11.5 to about 13.0, and preferably from about 12.1 to about 12.6. When sufficient alkaline hydroxide is added to adjust the pH of the calcium hypochlorite solution within the above ranges, a large portion of soluble calcium values is precipitated as lime. This may be accomplished batchwise or continuously, the latter technique being preferred. In addition, a portion of the lime and calcium hypochlorite values is co-precipitated as hemi-basic calcium hypochlorite crystals having the empirical formula:

$$Ca(OCl)_2 \cdot \tfrac{1}{2}Ca(OH)_2.$$

These hemi-basic crystals are substantially larger than the lime particles and range from about 2 to about 30 in microns in diameter. in contrast, the lime particles have a size of less than about 2, and generally, less than about 1 micron in diameter. The crystalline structure and particle size of the hemi-basic calcium hypochlorite crystals aid in the separation of the lime particles from the resulting slurry. Filtration rates have been increased by a factor of from about 10 to 20 when compared with the filtration rate of lime slurries which do not contain the hemi-basic calcium hypochlorite crystals in accordance with the process of this invention. When the alkaline hydroxide is added to the aqueous calcium hypochlorite solution in a proportion sufficient to adjust the pH in excess of about 13, which is about 4 to about 5 percent excess alkali, the excess alkaline hydroxide decomposes the hemi-basic crystals and the filtration rate of the lime slurry decreases drastically. If the proportion of alkaline compound added to the calcium hypochlorite solution is not enough to form a pH above about 11.5, decreased precipitation of the calcium values as lime occurs and a substantial content of calcium remains in the filtrate, resulting in substantial calcium values entering the sodium hypochlorite system.

In one embodiment of the invention, the alkaline hydroxide, generally as a 50 percent by weight aqueous solution of sodium hydroxide, is added to a dilution tank in which a recycle stream of precipitated paste filtrate is used to dilute the sodium hydroxide to about 10 to 20 percent NaOH. This diluted sodium hdyroxide overflows into a reactor where it reacts with the incoming paste filtrate containing calcium hypochlorite. With more concentrated NaOH streams, the reaction is difficult to control and the filterability varies widely. If water were used to dilute the caustic to the 10 to 20 percent NaOH, too much water would be added to the process requiring more evaporation in the chlorinator evaporator. For example, 50 percent sodium hydroxide has only 1 pound of water per pound of NaOH as compared to 9 pounds of water per pound of NaOH at 10 percent caustic.

The reaction between the alkaline compound and the calcium hypochlorite solution is carried out at a temperature from about 10° to about 50° and preferably from about 27°–32° C. The reaction is generally carried out in a continuous reactor at atmospheric pressure, but slightly elevated or reduced pressure may be used, if desired.

The residence time in the reaction zone or a suitable storage zone prior to recovering or separating the mixture of lime and hemi-basic calcium hypochlorite from the reaction mass generally ranges from about 20 to about 180 minutes and preferably from about 25 to about 45 minutes. Extended storage periods of the reaction mass, particularly at high caustic concentrations, will adversely affect the filtration rate.

After the reaction is completed a suitable separation technique such as filtration, centrifuging and the like is employed to separate the lime product and co-precipitated hemi-basic calcium hypochlorite crystals from the resulting slurry. When vacuum filters are employed, filtration rates from about 20 to about 40 gallons per hour per square foot of filter surface are generally obtained. Washing of the filter cake to remove adhering liquid containing impurities is easily effected because of the improved filtration rate imparted by the hemi-basic calcium hypochlorite particles.

The washed filter cake is generally comprised of the following components.

| Components | Percent by Weight | |
|---|---|---|
| | Broad Range | Narrow Range |
| Calcium hypochlorite | 0.5–8 | 1–3 |
| Calcium hydroxide (Total Alkali) | 25–40 | 30–34 |
| Sodium hypochlorite | 0.1–2.5 | 0.4–0.8 |
| Sodium chloride | 0.2–2.0 | 0.5–1.0 |
| Water | 50–75 | 60–70 |
| Calcium hypochlorite-hemi-basic | 0.5–10.0 | 1–4 |
| Free Lime | 25–35 | 28–34 |

It can be seen from the above analysis that, the weight ratio of lime to the crystalline hemi-basic calcium hypochlorite in the filter cake generally ranges from about 2.5:1 to about 50:1 and preferably about 7:1 to about 30:1.

The liquid recovered after separation of the lime from the slurry generally contains the following components in the following proportions.

| Components | Percent by Weight | |
|---|---|---|
| | Broad Range | Narrow Range |
| Calcium hypochlorite | 0-2.0 | 0-0.1 |
| Calcium hydroxide | 0.01-1.0 | 0.02-0.05 |
| Sodium hypochlorite | 8.50-12.0 | 9.5-10.0 |
| Sodium chloride | 15.0-18 | 16.5-17.0 |
| Water | 70-77 | 72-75 |
| NaOH | 0-1.0 | 0.1-0.4 |
| pH | 11-13.5 | 12.1-12.5 |

The wet lime cake, particularly, if produced in a continuous calcium hypochlorite process, can be recycled to the mixing zone and then the slurry chlorinator. Because of the washing, there is substantially no recycle of sodium chloride and other impurities in the lime, thereby reducing the size of recycle streams and improving the yield of calcium hypochlorite based upon initial lime fed to the reaction. The liquid recovered after separate of the lime can be further processes to recover salt values by evaporation, caustic addition, and clorination. It may also be used in the preparation of a bleach solution.

As indicated above, the technique for recovering lime from aqueous solutions of calcium hypochlorite in accordance with this invention can be applied to virtually any known process for preparing calcium hypoclorite where calcium values are lost after separation of the calcium hypochlorite dihydrate crystals. The novel process of this invention is particularly suitable for use in the process for preparing calcium hypochlorite described in parent U.S. Pat. No. 3,895,099.

More in detail, in the process of FIG. 1, lime (both fresh lime and recycle lime of the type described more fully below), water and sodium hypochlorite are admixed in mixing zone 1 to form a mixing zone slurry. Mixing zone 1 is a mixing tank or other suitable container with agitation means for blending the various components fed thereto. There may be some degree of reaction between the various components fed to mixing zone 1, but an important function of mixing zone 1 is to admix the components, and therefore it is referred to as a "mixing zone", even though some "reaction" may occur in some embodiments of the invention.

The resulting mixing zone slurry is conveyed to slurry chlorinator 2 and reacted with chlorine. Slurry chlorinator 2 is any suitable chlorination apparatus provided with agitation means for maximum contact between chlorine and slurry. It is preferred to employ as slurry chlorinator 2 an evaporator chlorinator which utilizes the chlorination technique described in U.S. Pat. No. 3,241,912, issued to Bernard H. Nicolaisen on Mar. 22, 1966. Temperature within slurry chlorinator 2 is maintained within the range from about 0 to about 50 and preferably from about 20° to about 32° C.

During chlorination of the slurry in slurry chlorinator 2, lime reacts with chlorine to form calcium hypochloritein accordance with Equation (1):

$$Ca(OH)_2 + Cl_2 \rightarrow \tfrac{1}{2}Ca(ClO)_2 + H_2O + \tfrac{1}{2}CaCl_2 \qquad (1)$$

Some sodium hydroxide may be present in the mixing zone slurry as a result of feeding sodium hydroxide (not shown) to mixing zone 1, or it may be present in the recycle lime fed to a mixing zone 1. Any sodium hydroxide present in the slurry chlorinator 2 is reacted with chlorine to form sodium hypochlorite in accordance with Equation (2):

$$2NaOH + Cl_2 \rightarrow NaClO + NaCl + NaCl + H_2O \qquad (2)$$

Sodium hypochlorite present in slurry chlorinator 2 reacts with calcium chloride to form sodium chloride and additional calcium hypochloride in accordance with Equation (3):

$$NaClO + \tfrac{1}{2}CaCl_2 \rightarrow \tfrac{1}{2}Ca(ClO)_2 + NaCl \qquad (3)$$

The primary products of slurry chlorinator 2 are calcium hypochlorite, sodium chloride and water. At start-up of the process, it is preferred, but not necessary to fill slurry chlorinator 2 with a slurry or "paste" of calcium hypochlorite solids suspended in an aqueous solution of sodium chloride and calcium hypochlorite, with an excess alkali concentration in the slurry being less than about 1.0 and preferably less than about 0.50 percent by weight. The rate of feed of mixing zone slurry and chlorine to slurry chlorinator 2 and rate of evaporation of water, if any, are adjusted to maintain the concentration of unreacted alkali during the reaction below about 1.0 percent. Continuous chlorination of the slurry in this manner causes the formation of coarse calcium hypochlorite dihydrate crystals which are much more easily separated from paste liquor in cake separator 3, than are calcium hypochlorite dihydrate crystals prepared in a conventional triple salt process or a batch type process.

A portion of the resulting "paste" comprised of solid calcium hypochlorite dihydrate and a "paste" liquor, which is predominately an aqueous of sodium chloride and calcium hypochlorite is continuously withdrawn from slurry chlorinator 2 and conveyed to cake separator 3.

Cake separator 3 is a filter, centrifuge, or other suitable solid-liquid separating apparatus capable of separating a moist cake of calcium hypochlorite dihydrate crystals from the aqueous solution of sodium chloride and calcium hypochlorite.

Moist cake from cake separator 3 generally contains from about 40 to about 60 percent by weight of calcium hypochlorite dihydrate, from about 2 to about 15 percent by weight of sodium chloride, and from about 38 to about 52 percent by weight of water. Moist cake is generally conveyed to dryer 4 where it is heated to remove most of the water. Dryer 4 is any suitable drying unit or units capable of reducing the moisture content of the calcium hypochlorite cake to the desired level without causing excess decomposition of the calcium hypochlorite particles.

Generally the water content of the calcium hypochlorite is reduced in dryer 4 to below about 10 percent by weight and preferably from about 0.5 to about 7.5 percent by weight. The calcium hypochlorite content of the dried calcium hypochlorite generally ranges from about 65 to about 85, and preferably from about 70 to about 80 percent by weight. The remainder of the dried calcium hypochlorite is predominately sodium chloride. The dried product is then placed in suitable containers, with or without prior size classification or other processing such as pelletizing, prior to use in water treatment or other utility.

"Paste liquor" (or "paste filtrate" when cake separator 3 is a filter) is an aqueous sodium chloride solution from cake separator 3 which also contains soluble calcium hypochlorite. This paste liquor is conveyed to caustic reactor 5, which is any suitable mixing tank reactor provided with agitation means, where it is reacted with an aqueous solution of a soluble metal hydroxide, preferably sodium hydroxide, to form a lime slurry.

The aqueous solution of sodium hydroxide is prepared by admixing sodium hydroxide or other alkaline compounds in dilution tank 6 with a portion of the lime slurry from caustic reactor 5. The lime slurry is conveyed from caustic reactor 5 to dilution tank 6 by means of caustic reactor pump 7. Sufficient lime slurry is recycled to the dilution tank to form an alkaline aqueous slurry in which the proportion of sodium hydroxide or other soluble metal hydroxide is in the range from about 10 to about 20 percent by weight.

The recycle flow of lime slurry is preferably maintained uniform, and as the reaction requires more or less alkali to maintain the desired pH in reactor 5, the control system adds more or less caustic to the dilution tank resulting in a variation of the NaOH concentration in the dilution system. The slurry in the caustic reactor 5 is maintained at a pH of about 11.5 to about 13.0, and preferably from about 12.1 to about 12.6 by increasing or decreasing the caustic flow to dilution tank 6.

A portion of the lime slurry is conveyed to lime separator 8 such as a filter, where the solid lime particles and the resulting hemi-basic calcium hypochlorite crystals are separated from the aqueous mother liquor, which predominates in sodium chloride.

The reaction between the alkaline compound such as sodium hydroxide and the calcium hypochlorite in the paste liquor proceeds in accordance with Equations (4) and (5).

$$2NaOH + Ca(ClO)_2 \rightarrow Ca(OH)_2 + 2NaClO \qquad (4)$$

$$\tfrac{1}{2}Ca(OH)_2 + Ca(OCl)_2 \rightarrow Ca(OCl)_2 \cdot \tfrac{1}{2}Ca(OH)_2 \qquad (5)$$

The crystals of lime and hemi-basic calcium hypochlorite crystals in the cake formed in lime separator 8 are easily washed with water to remove excessive salt from the lime cake and the washed cake is recycled to mixing zone 1.

Mother liquor, the aqueous solution of sodium chloride and sodium hypochlorite recovered in lime separator 8, may be utilized as bleach liquor. This mother liquor contains essentially no calcium hypochlorite values. Therefore, a much larger percentage of lime fed into the system is recovered as large crystals of calcium hypochlorite dihydrate rather than as an impurity in an effluent stream or sold as a less expensive bleach liquor. However, mother liquor from lime separator 8 is preferably recycled to the process as described more fully below.

Figure 2:
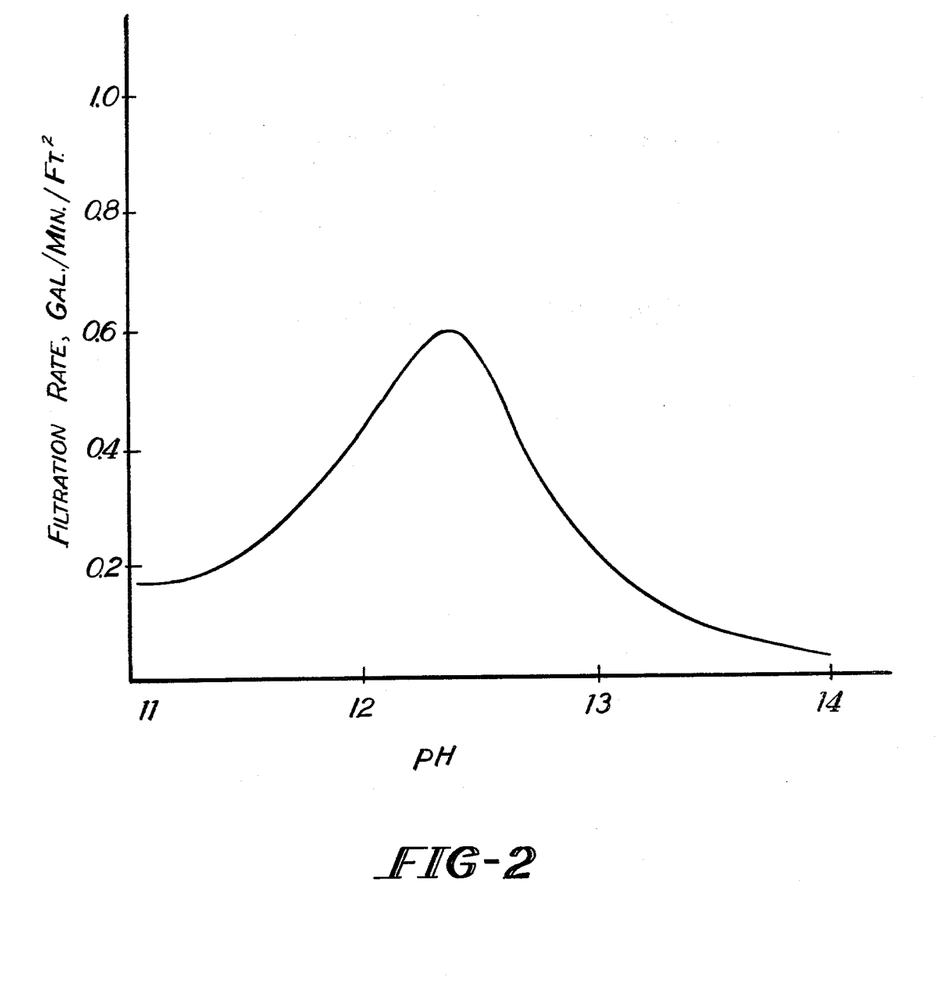
FIG. 2 shows the variation of filtration rate with pH.

As shown in FIG. 2, the filtration rate at pH 11.5 to 13.0 ranges from about 0.2 to about 0.6 gallons per minute per square foot of a filter area. When the pH is below about 11.5 or above about 13.0, the filtration rate drops substantially to 0.05 gallons per minute per square foot or less.

In a second embodiment of the invention an aqueous solution of sodium chloride and sodium hypochlorite from lime separator 8 is conveyed to an evaporator-chlorinator (not shown) where the aqueous solution is concentrated by evaporation and is reacted with sodium hydroxide and chlorine to form a slurry of solid sodium chloride in an aqueous solution of sodium hypochlorite.

This evaporation and reaction is carried out in any suitable evaporation apparatus and chlorinator-reactor provided with agitation means. Simultaneous evaporation and chlorination may be carried out in an evaporative chlorinator using the chlorination technique described in U.S. Pat. No. 3,241,912, issued to Bernard H. Nicolaisen on Mar. 22, 1966.

In a preferred embodiment of the invention, the mother liquor is first concentrated by evaporation with steam, in an evaporator (not shown) and the resulting concentrated mother liquor is then reacted with chlorine and sodium hydroxide in the evaporator-chlorinator, utilizing the heat of chlorination to complete evaporation of the mother liquor and effect precipitation of salt in the mother liquor.

Evaporation prior to reaction in the evaporator-chlorinator is generally more economical since the rate of evaporation of water is more rapid from the dilute mother liquor prior to reacting and therefore smaller, less expensive evaporators may be used than are required for the more concentrated slurry of salt and mother liquor.

In another embodiment of the invention, no chlorine or sodium hydroxide are added to the evaporator-chlorinator and only evaporation takes place in the evaporator-chlorinator to effect precipitation of salt in the mother liquor. The degree of evaporation will depend upon the initial mother liquor concentration.

When chlorination is used, the temperature during chlorination is generally maintained within the range from about 0 to about 50 and preferably from about 20 to about 32° C.

In this embodiment, sufficient chlorine and sodium hydroxide are added to and sufficient water is removed from the mother liquor fed to the evaporator-chlorinator to maintain in the solution portion of the resulting slurry a sodium hypochlorite concentration within the range from about 15 to about 40 and preferably from about 25 to about 35 percent by weight. In addition, the soluble sodium chloride concentration in the solution portion of the slurry from evaporator-chlorinator is maintained from about 4 to about 14 and preferably from about 4.8 to about 7.7 percent be weight. The solid sodium chloride concentration in the slurry from the evaporator-chlorinator ranges from about 15 to about 35, and preferably from about 18 to about 28 percent by weight. The resulting slurry is conveyed to a salt separator (not shown) which is a suitable filter, centrifuge or similar solid-liquid separating apparatus. In the salt separator, relatively pure sodium chloride crystals are separated from the aqueous sodium hypochlorite solution. These crystals may be used in the preparation of brine which is used as a feed material for electrolytic cells used in the preparation of chlorine and sodium hydroxide.

The aqueous solution of sodium hypochlorite which is also separated from the salt separator, is recycled to mixing zone 1 for further admixing with fresh lime and recycled lime.

Figure 1:
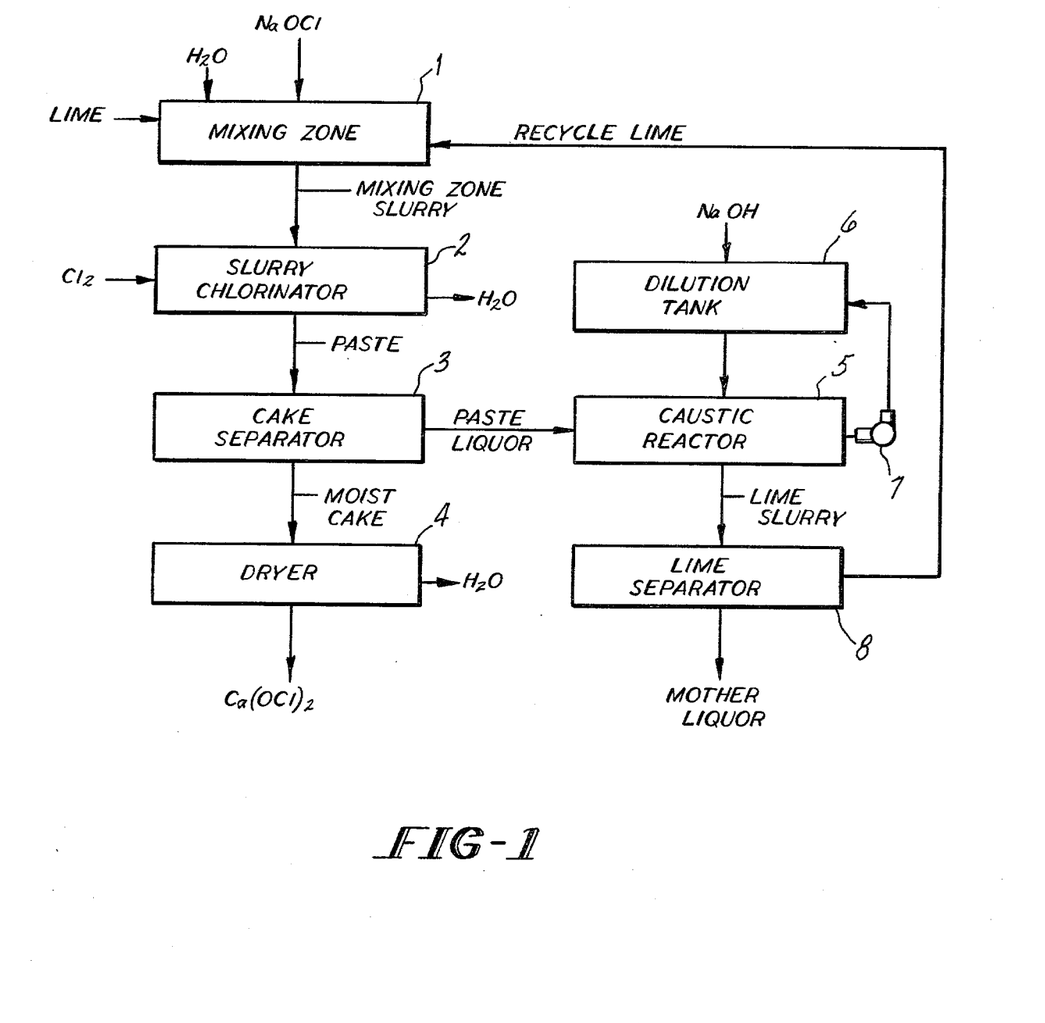
FIG. 1 is a flow sheet of a preferred embodiment of the present invention showing the separation of calcium hypochlorite and precipitation of lime from the paste liquor.

This embodiment of the invention not only results in easily filterable lime, large crystals of hemi-basic calcium hypochlorite and more efficient utilization of calcium values as calcium hypochlorite, as in the embodiment of FIG. 1, but also produces relatively pure sodium chloride in solid form, which has utility in the preparation of brine feed for electrolytic cells. There are no impure aqueous solutions of sodium chloride, calcium hypochlorite or the like which need to be disposed of in the latter embodiment thereby avoiding a serious pollution problem.

A third embodiment of the invention includes the second embodiment above as well as a technique for purifying at least a portion of the fresh lime fed to the process prior to admixing with sodium hypochlorite in mixing zone 1 and recycling at least a portion of the paste liquor to mixing zone 1.

In the third embodiment, an aqueous slurry of fresh lime is chlorinated in lime chlorinator (not shown) to form an aqueous solution of calcium hypochlorite and calcium chloride in accordance with Equation (1). Impurities in the fresh lime include insoluble impurities such as silica, aluminum salts, iron salts, magnesium salts, magnesia, unburned limestone (calcium carbonate and magnesium carbonate) and other components in trace quantities. These impurities present in the fresh lime remain insoluble in the aqueous solution formed in the lime chlorinator and form a slurry with the aqueous solution of calcium hypochlorite and calcium chloride. This slurry is conveyed to an impurity separator (not shown), which is a suitable solid-liquid separator such as a filter, centrifuge or the like, where solid impurities are separated. Solid impurities from the impurity separator are generally disposed of as solid waste, land fill or the like. The aqueous solution of calcium hypochlorite and calcium chloride from the impurity separator is conveyed to mixing zone 1. As indicated above, the primary function of mixing zone 1 is to effect admixing of the components fed thereto. However, in the third embodiment, the calcium chloride component of the aqueous solution from the impurity separator is reacted in mixing zone 1 with sodium hypochlorite to form an aqueous solution of calcium hypochlorite and sodium chloride in accordance with Equation (3).

In the third embodiment, at least a portion of the fresh lime is purified in the lime chlorinator and impurity separator prior to feeding to mixing zone 1, and a portion of the fresh lime fed to mixing zone 1 may be untreated. The ratio of fresh lime in each of these feed streams depends upon the initial purity and activity of the fresh lime fed to the process as well as specifications for impurities required for the calcium hypochlorite product. Thus, if the fresh lime is relatively pure and the standards for purity of the calcium hypochlorite are not high, then little or no fresh lime has to be purified prior to feeding to mixing zone 1. However, if the lime is relatively impure, then a large fraction or all of the fresh lime is purified in the lime chlorinator and impurity separator prior to feeding to mixing zone 1.

In all of the above defined embodiments, in order to maintain within the mixing zone slurry the concentration of lime (both fresh lime, if added, and recycled lime) within the desired range, and the concentration of sodium hypochlorite within the desired range, additional sodium hydroxide may be added to mixing zone 1. In addition, in order to improve control of the chlorination and heat transfer in slurry chlorinator 2 a portion of the paste liquor from cake separator 3 may be recycled to mixing zone 1.

The primary raw materials for the process of this invention are lime, sodium hydroxide, chlorine and water.

Fresh lime is added to the process at mixing zone 1 and/or the lime chlorinator. One of the advantages of a preferred embodiment of this invention is that relatively impure lime may be utilized to prepare a relatively pure calcium hypochlorite product. For example, lime having an active lime content as low as 85 percent by weight or less may be added to the lime chlorinator in accordance with the third embodiment of this invention, and produce a relatively pure calcium hypochlorite product. Generally the active lime content of the lime fed to the lime chlorinator and/or mixing zone 1 ranges from about 85 to about 100 percent, and preferably from about 90 to about 97 percent by weight of active lime. Lime impurities of the type described above may range from about 0 to about 15 percent and generally from about 3 to about 10 percent by weight of the lime.

Typical illustrative specifications for a preferred fresh lime feed and for an acceptable lime feed are as follows:

| Component | Preferred | Acceptable |
|---|---|---|
| Ca(OH)$_2$ min. % | 95.0 | 85 |
| CaCO$_3$ max. % | 1.0 | 3.0 |
| MgO max. % | 0.5 | 3.5 |
| SiO$_2$ max. % | 0.5 | 2.5 |
| Fe$_2$O$_3$ + Al$_2$O$_3$ max. % | 0.5 | 1.5 |
| CaSO$_4$ max. % | 0.5 | 1.5 |

Generally from 0 to less than about ½ of the lime feed meeting the above-illustrative preferred specifications does not need to be processed in accordance with the lime purification embodiment of the third embodiment. However, when processing lime feed meeting the above illustrative acceptable specifications a major portion up to all of the feed may have to be processed in accordance with the lime purification step of the third embodiment. The average particle size of fresh lime added to the process generally is substantially all −325 mesh (wet screen analysis) but particles up to about −200 mesh may be employed if desired.

When the impurity content of lime in the lime feed is greater than about 5 percent by weight, it may be desirable to add the lime chlorinator a carbonating agent such as carbon dioxide or sodium carbonate to enhance precipitation and removal of the impurities in solid form from impurity separator 10.

As indicated above, fresh lime is fed to the system either through the lime chlorinator or mixing zone 1, or a combination of both. It is preferred to feed from about 25 to about 100 percent of the fresh lime into the lime chlorinator and any balance of fresh lime being fed into mixing zone 1. When all of the fresh lime is fed to the lime chlorinator then substantially all of the lime fed to mixing zone 1 is in the form of recycle lime slurry, the concentrated slurry of precipitated lime. Fresh lime is fed to the lime chlorinator as an aqueous slurry containing from about 10 to about 30 percent, and preferably from about 15 to about 20 percent by weight of active lime. Into mixing zone 1, lime may be added dry or as a slurry up to about 50 percent lime by weight.

Lime added to mixing zone 1 as recycle lime from lime separator 8 is substantially pure lime, having an active lime content of from about 85 to about 100 percent by weight. The solid content of the recycle lime slurry generally ranges from about 20 to about 50 and preferably from about 25 to about 35 percent by weight of solids, which are predominately lime, and containing some hemi-basic crystals of calcium hypochlorite.

Sodium hydroxide is added to dilution tank 6, the evaporator chlorinator and if desired, to mixing zone 1, as a concentrated aqueous solution, generally ranging from about 40 to about 60 percent by weight of sodium hydroxide. However, sodium hydroxide may be added in anhydrous form to dilution tank 6 and the evaporator-chlorinator, and if desired, to mixing zone 1.

In addition, sodium hypochlorite added to mixing zone 1 in FIG. 1 may be prepared by chlorinating an aqueous solution of sodium hydroxide, in a suitable agitated chlorinator reactor (not shown). The sodium hydroxide concentration in the aqueous solution used to make sodium hypochlorite for feed to mixing zone 1 of FIG. 1 ranges from about 20 to about 75 and preferably from about 35 to about 55 percent by weight. In the second and third embodiments, sodium hypochlorite solution is added to the mixing zone as a recycle stream from the salt separator. Concentration of this recycle stream by evaporation in the evaporator-chlorinator is generally sufficient to maintain the desired sodium hypochlorite concentration in mixing zone 1. However, if desired, any necessary additional sodium hydroxide may be added directly to mixing zone 1 or additional sodium hypochlorite may be prepared by chlorinating an aqueous solution of sodium hydroxide and then added to mixing zone 1 as described above with respect to FIG. 1, or may be added to mother liquor prior to or simultaneous with chlorination in the evaporator-chlorinator.

The overall reaction for the process of this invention may be illustrated by Equation (6):

$Ca(OH)_2 + 2Cl_2 + 2NaOH \rightarrow Ca(ClO)_2 + 2NaCl + 2H_2O$ tm (6)

Thus, the stoichiometric proportion of fresh sodium hydroxide fed to the process is equivalent to two moles of sodium hydroxide per mole of active lime present in the fresh lime fed to the process. As indicated in the embodiment of FIG. 1, sodium hydroxide is fed to caustic reactor 5 and may be used to form sodium hypochlorite fed to mixing zone 1. In the second embodiment, sodium hydroxide is added to caustic reactor 5 and the evaporator-chlorinator (not shown). In the third embodiment, sodium hydroxide is added to caustic reactor 5, and to either the evaporator-chlorinator or mixing zone 1, or both. The relative ratio of proportions of sodium hydroxide added to the different units of the different embodiments may be varied over a wide range. Generaly, above about 20 and preferably from about 22 to about 35 percent of the stoichiometric proportion of sodium hydroxide required in Equation (6) is added to caustic reactor 5 to precipitate lime and hemibasic calcium hypochlorite crystals from the paste liquor. The balance of the stoichiometric proportion of sodium hydroxide is added in the embodiment of FIG. 1 as sodium hypochlorite to mixing zone 1. The balance of sodium hydroxide is added to the evaporator-chlorinator in the second embodiment. The balance of sodium hydroxide is added either entirely to evaporator-chlorinator in the third embodiment, or up to about 70 percent of the balance of the stoichiometric proportion may be added to mixing zone 1.

In the embodiment of FIG. 1 and the second embodiment where lime (both fresh and recycled) and sodium hypochlorite solution are added to mixing zone 1, the resulting mixing zone slurry has a lime concentration ranging from about 1 to about 25 and preferably from about 2 to about 20 weight percent and a sodium hypochlorite concentration ranging from about 1.5 to about 30, and preferably from about 2 to about 26 percent by weight. In the third embodiment, when all or part of the fresh lime is purified in the lime chlorinator and impurity separator to form an aqueous solution of calcium hypochlorite and calcium chloride which is fed to mixing zone 1, the resulting mixing zone slurry has a lime concentration and sodium hypochlorite concentration within the above ranges as well as a concentration of calcium hypochlorite ranging from about 0 to about 30, and preferably from about 5 to about 26 percent by weight. All of the calcium chloride fed to mixing zone 1 reacts with sodium hypochlorite to form calcium hypochlorite and sodium chloride in accordance with Equation (3).

The ultimate water content in the mixing zone slurry is controlled by adjusting the water content of the various feed streams to mixing zone 1. For example, the content of the aqueous solution of calcium hypochlorite and calcium chloride (when lime purification of the third embodiment is used), the water content of any lime slurry added, (either fresh or recycled lime) the water content of the sodium hypochlorite (either fresh sodium hypochlorite or recycled), and if desired, the quantity of recycled paste liquor from cake separator 3 are controlled to obtain a mixing zone slurry of the desired concentration range described above.

As indicated above, slurry-chlorinator 2 at start-up, is preferably filled, but not necessarily filled, with a slurry of calcium hypochlorite solids suspended in an aqueous solution of sodium chloride. The excess lime or other alkali in the slurry is maintained below about 1.0 and preferably less than about 0.5 percent by weight of the slurry. The feed rate of mixing zone slurry and chlorine to mixing slurry chlorinator 2 and the withdrawal rate of the resulting calcium hypochlorite paste are adjusted to achieve substantially complete chlorination of the calcium hydroxide values fed to slurry chlorinator 2 in mixing zone slurry, while maintaining the free lime or alkali concentration in surry chlorinator 2 preferably below about 1.0 percent by weight of the slurry.

Chlorine is added to slurry chlorinator 2 as well as the evaporator-chlorinator and lime chlorinator in either gaseous or liquid form. The chlorination reactions are carried out preferably continuously in an evaporator-type chlorinator of the type described above.

Paste from slurry chlorinator 2 is predominately a slurry of calcium hypochlorite dihydrate in an aqueous solution of sodium chloride and calcium hypochlorite. The paste contains calcium hypochlorite dihydrate crystals in the concentration of from about 10 to about 35 and preferably from about 15 to about 30 percent by weight. These crystals are predominately rectangular platelets which are several microns in thickness, and have substantially equal sides ranging from about 50 to about 300 microns in length with the major portion having sides ranging from about 100 microns to about 250 microns in length. Generally, less than about 5 percent of the crystals are "twin crystals" which entrain paste liquor, which are difficult to separate from the paste liquor, and which are difficult to dry. Since more than about 95 percent of the calcium hypochlorite dihydrate crystals obtained by the process of this invention may be large platelets or cohesive agglomerates, there is a minimal amount of paste liquor entrained in the crystals during the separation in cake separator 3, even when filtered on a drum filter. The crystals are easier to separate from the paste liquor in cake separator 3 and are easier to dry in dryer 4 than crystals produced by conventional calcium hypochlorite techniques. In prior art techniques, more expensive high speed titanium centrifuges are necessary to obtain crystals of equivalent purity.

Moist cake from cake separator 3 contains from about 40 to about 60 percent by weight of $Ca(OCl)_2.2H_2O$, from about 2 to about 15 percent by weight of NaCl, and from about 40 to 50 percent by weight of water. This moist cake may be used directly in the treatment of water systems such as swimming pools and the like, but is generally dried and stored prior to use. The moist cake is dried by known means for example, using a spray dryer, turbodryer or vacuum dryer where the appropriate temperature ranges are employed to reduce the water content to the desired level. In the process of the present invention, the cake is dried, for example in a turbodryer with hot air while maintaining the product temperature in the range from about 35 to about 110° C., and preferably from about 40° to about 95° C. to give a product having a calcium hypochlorite content from about 65 to about 85, a water content below about 10 percent by weight and the bulk of the remainder being sodium chloride.

Paste liquor from cake separator 3 generally has a sodium chloride concentration ranging from about 15 to about 22 percent, and preferably from about 17 to about 20 percent by weight, a calcium hypochlorite concentration ranging from about 7 to about 15 percent and preferably from about 8 to about 12 percent by weight, and a water content ranging from about 60 to about 75 percent and preferably from about 68 to about 73 percent by weight.

As indicated in the third embodiment, a portion of the paste liquor may be recycled to mixing zone 1, if desired, to improve control of the chlorination and heat transfer in slurry chlorinator 2. Generally, from 0 to about 40 and preferably from about 0 to about 10 percent by weight of the paste liquor is recycled to mixing zone 1, the balance being conveyed to caustic reactor 5.

As discussed above, a concentrated alkali is diluted to about 10 to 20 percent in dilution tank 6 with lime slurry from caustic reactor 5, and paste liquor is then reacted with this alkaline slurry in caustic reactor 5 to precipitate lime and a small proportion of hemi-basic calcium hypochlorite crystals. The resulting lime slurry is conveyed in lime separator 8. The lime slurry is separated in lime separator 8 to form a wet lime cake and a mother liquor containing from about 7 to about 20 and preferably from about 8 to about 15 percent by weight of sodium hypochlorite and from about 15 to about 22 and preferably from about 17 to about 20 percent by weight of sodium chloride. This mother liquor may be sold as bleach liquor but is preferably conveyed to the evaporator-chlorinator as described above, wherein it is reacted with chlorine and sodium hydorxide and evaporated to effect precipitation of sodium chloride. Sodium chloride is separated from the resulting solution in the salt separator and may be used to prepare a brine feed for electrolytic cells. The resulting aqueous solution from the salt separator contains from about 15 to about 40 and preferably from about 18 to about 35 percent by weight of sodium hypochlorite and from about 4 to about 14 and preferably from about 4 to about 8 percent by weight of sodium chloride.

Recovered lime cake, after washing, from lime separator 8 is recycled as recycled lime to mixing zone 1. Recycled lime contains from about 25 to about 50 and preferably from about 35 to about 45 percent by weight of solid lime having a purity of from about 85 percent to about 100 percent by weight of active lime. The lower part of this purity range is obtained when higher proportions of calcium hypochlorite-hemi-basic crystals are co-precipitated. However, more concentrated lime slurries or cakes may be recovered from lime separator 8, if desired.

The process of the present invention is preferably carried out on a continuous basis which permits higher rates of chlorination and thus increased rates of production. Continuous chlorination also produces calcium hypochlorite dihydrate crystals which are more easily separated by the solid-liquid method of separation employed and which are easier to dry.

The reaction conditions during the chlorination steps have been described above. Generally, the evaporation steps are carried out at temperatures ranging from about 18° to about 45° C. and at pressures ranging from about 15 to about 35 mm Hg. All of the other steps of the process are carried out at ambient pressure and temperature conditions.

Various operating problems occurring during batch chlorination are eliminated. Lime for this process does not need to be the high purity lime needed for most conventional commercial processes and therefore lime from virtually any source can be employed.

The following examples are presented to illustrate the invention more fully. All parts and percentages are by weight unless otherwise specified.

EXAMPLE 1

Using the process illustrated in FIG. 1, 5146 parts per hour of a solution containing 27.97 percent NaOCl were admixed in mixing zone 1, an agitated vessel, with 4058 parts per hour of an aqueous lime slurry containing 30.2 percent active lime. The slurry was prepared from 1270 parts per hour of raw lime containing 96.5 percent Ca(OH)$_2$ (the balance being silica, iron oxide, aluminum oxide and the like), and 369 parts per hour of recycled precipitated lime from lime separator 8 as a 35 percent lime cake. The mixture was blended in the mixing zone to form a slurry, which was transferred to slurry chlorinator 2 where 1561 parts per hour of liquid chlorine were added while the slurry was thoroughly agitated and the temperature maintained at about 30° C. The calcium hypochorite paste which formed in slurry chlorinator 2 contained calcium hypochlorite dihydrate crystals in an aqueous NaCl solution. This paste was withdrawn from the slurry chlorinator at the rate of about 11381 parts per hour. The paste contained 26.05 percent $Ca(OCl)_2$, 15.16 percent NaCl and 56.67 percent $H_2O$. The remainder was chlorate (0.54 percent) and inert ingredients (1.08 percent).

The feed rate of mixing zone slurry and chlorine and the withdrawal rate of paste from slurry chlorinator 2 were adjusted to maintain concentration of free alkali in slurry chlorinator 2 of less than about 0.5 percent.

The resulting paste was conveyed to cake separator 3, which was a filter, where the paste was separated into a moist cake and a paste liquor. The crystals of the calcium hypochlorite dihydrate in the moist cake were flat platelets of a few microns in thickness and sides which ranged from about 50 to about 300 microns in length with about 70 to about 90 percent of the crystals being larger than 100 microns in length.

Moist cake was removed from the filter at a rate of 4762 parts per hour. The moist cake, which contained 46.26 percent Ca(OCl)$_2$, 9.43 percent NaCl and 42.82 percent H$_2$O, the remainder being chlorates (0.34 percent) and inert ingredients (0.67 percent), was transferred to a dryer and dried with hot air while maintaining the product temperature in the range of from 45° to 90° C. A dried calcium hypochlorite product was recovered from the dryer at the rate of 2451 parts per hour, containing from 74.7 percent Ca(OCl)$_2$, 18.6 percent NaCl and having a water content of less than 1 percent, the balance being calcium chloride (0.5), calcium chlorate (0.9), calcium hydroxide (2.1), and calcium carbonate (2.2). From the filter, 6369 parts per hour of paste liquor containing about 10.15 percent Ca(OCl)$_2$, 19.68 percent NaCl and 67.57 percent H$_2$O were recovered and transferred to a caustic reactor 5. In caustic reactor 5, paste liquor was reacted with 2800 parts per hour of an aqueous alkaline lime slurry. This alkaline lime slurry was prepared by recycling 1943 parts per hour of the lime slurry formed in caustic reactor 5 to dilution tank 6, where it was admixed with 857 parts per hour of a 50 percent aqueous sodium hydroxide solution to form an alkaline lime slurry in which the solution component of the slurry contained about 15.3 percent by weight of sodium hydroxide. Sufficient alkaline lime slurry from dilution tank 6 was fed to caustic reactor 5 with the paste liquor to maintain a pH of 12.07 in the solution component of the lime slurry and caustic reactor 5.

Lime slurry from caustic reactor 5 was conveyed at the rate of 7264 parts per hour to a filter, which served as lime separator 8, where the slurry was separated into a mother liquor and a lime cake containing some hemi-basic calcium hypochlorite crystals. The lime cake was washed with water and recycled to mixing zone 1. Analyses of the mother liquor, the unwashed lime cake and the washed lime cake were as follows:

| Component | Percent by Weight Unwashed Lime Cake | Washed Lime Cake | Mother Liquor |
|---|---|---|---|
| Ca(OCl)$_2$ | 3.84 | 4.23 | 0 |
| Ca(OH) | 30.41 | 32.85 | 0.07 |
| NaOCl | 6.96 | 0.16 | 9.5 |
| NaCl | 11.44 | 1.25 | 16.67 |
| H$_2$O | 47.35 | 61.50 | 73.63 |
| NaOH | | | 0.13 |
| pH | | | 12.07 |

When 300 ccs. of the lime slurry produced in caustic reactor 5 was filtered on a fritted glass filter under a vacuum of 23 inches of mercury, 2 minutes and 26 seconds were required to complete the filtration, which was equivalent to a filtration of about 0.487 gallons per minute per square foot.

For purposes of comparison the procedure of this example was repeated except that the pH of caustic reactor was maintained above about 14, which has an excess caustic concentration of 1.63 percent NaOH, which prevented the formation of hemi-basic calcium hypochlorite crystals in the lime slurry. Filtering 300 ccs. of the resulting lime slurry in the same type of fritted glass filter required 39 minutes and 10 seconds to complete the filtration, which was equivalent to a filtration rate of about 0.030 gallons per minute per square foot.

The moist lime cake from the filter 8 was recycled to mixing zone 1.

Clarified mother liquor was recovered from lime separator 8 at the rate of about 6649 parts per hour, and stored for use as a liquid bleach.

EXAMPLES II–XIV

The procedure of Example 1 was repeated except that the pH of the precipitation step was varied in accordance with the ranges set forth below in the Table. The variation of the filtration rate with pH is also shown in the Table.

TABLE I

| | Weight % Of Solid Product | | | |
|---|---|---|---|---|
| Examples | Hemibasic Calcium Hypochlorite | Lime | pH | Filtration Rate GPM Per Square Foot |
| 2 | 9.38 | 25.97 | 12.13–12.20 | 1.031–0.608 |
| 3 | 3.70 | 28.55 | 12.35–12.45 | 0.445–0.593 |
| 4 | 4.58 | 31.15 | 12.1–12.2 | 0.462–0.569 |
| 5 | 0.69 | 31.55 | 12.4–12.6 | 0.456–0.516 |
| 6 | 4.44 | 34.02 | 12.16–12.25 | 0.501–0.468 |
| 7 | 1.61 | 34.75 | 12.14–12.39 | 0.404–0.404 |
| 8 | 5.32 | 31.76 | 12.21–12.28 | 0.487–0.565 |
| 9 | 1.11 | 36.73 | 12.28–12.37 | 0.552–0.531 |
| 10 | 4.26 | 32.03 | 12.12–12.24 | 0.481–0.516 |
| 11 | 1.36 | 32.26 | 12.46–12.49 | 0.434–0.474 |
| 12 | | | 11.9 | 0.136 |
| 13 | | | 11.7 | 0.127 |
| 14 | | | 11.3 | 0.124 |

What is desired to be secured by Letters Patent is:

1. In a process for recovering lime from an aqueous solution of calcium hypochlorite wherein lime is precipitated in a reaction zone by the reaction of an alkali metal hydroxide with said aqueous solution, and recovering the solid lime particles produced thereby, the improvement which comprises reacting said alkali metal hydroxide with said aqueous solution in proportion sufficient to maintain the pH of the range from about 12.1 to 12.6, whereby a mixture of crystalline particles of hemi-basic calcium hypochlorite and lime is formed.

2. The process of claim 1 wherein said alkali metal hydroxide is sodium hydroxide.

3. The process of claim 2 wherein said aqueous solution contains an alkali salt.

4. The process of claim 3 wherein a portion of the resulting lime slurry is admixed with said sodium hydroxide prior to reacting with said aqueous solution of calcium hypochlorite to form an alkaline lime slurry having a solid component and a liquid component, wherein said liquid component contains from about 10 to about 20 percent by weight of sodium hydroxide, and reacting said alkaline lime slurry with said aqueous solution.

5. The process of claim 4 wherein the aqueous lime slurry formed in said reaction is formed from a liquid component and a solid component, wherein said solid component is comprised of a mixture of lime and hemi-basic calcium hypochlorite crystals wherein the ratio of said lime to said hemi-basic calcium hypochlorite crystals are in the range from about 2.5:1 to about 50:1.

6. The process of claim 5 wherein said aqueous solution of calcium hypochlorite contains from about 5 to about 12 percent by weight of calcium hypochlorite and from about 16 to about 20 percent by weight of sodium chloride.

7. The process of claim 6 wherein said residence time of said mixture in said reaction zone prior to recovering said solids ranges from about 20 to about 180 minutes.

8. The process of claim 7 wherein said residence time ranges from about 25 to about 45 minutes.

9. The process of claim 3 wherein said alkali salt is an alkaline earth metal salt.

10. The process of claim 9 wherein said alkaline earth metal salt is calcium chloride.

11. The process of claim 10 wherein said aqueous solution of calcium hypochlorite contains from about 1 to about 10 percent by weight of calcium hypochlorite and from about 15 to about 40 percent by weight of calcium chloride.

12. The process of claim 11 wherein said aqueous solution of calcium hypochlorite contains from about 1 to about 8 percent by weight of calcium chloride and from about 18 to about 35 percent by weight of calcium chloride.

13. The process of claim 3 wherein said alkali salt is an alkali metal salt.

14. The process of claim 13 wherein said alkali metal salt is sodium chloride.

15. The process of claim 2 wherein said sodium hydroxide is added as an aqueous sodium hydroxide solution containing from about 10 to about 20 percent by weight of sodium hydroxide.

16. The process of claim 15 wherein said aqueous solution of calcium hypochlorite contains from about 5 to about 12 percent by weight of calcium hypochlorite and from about 16 to about 20 percent by weight of sodium chloride.

17. The process of claim 16 wherein said aqueous solution of calcium hypochlorite contains from about 9.5 to about 10.5 percent by weight of calcium hypochlorite and from about 17 to about 18 percent by weight of sodium chloride.

18. The process of claim 1 wherein the residence time of said mixture in said reaction zone prior to recovering said solids from said reaction zone is from about 20 to about 180 minutes.

19. The process of claim 18 wherein said residence time is from about 25 to about 45 minutes.

* * * * *

UNITED STATES PATENT AND TRADEMARK OFFICE
CERTIFICATE OF CORRECTION

PATENT NO. : 4,196,184

DATED : April 1, 1980

INVENTOR(S) : Walter J. Sakowski

It is certified that error appears in the above-identified patent and that said Letters Patent are hereby corrected as shown below:

Column 1, line 7, delete "3,885,099" and insert --3,895,099--.

Column 1, line 48, delete "of" and insert --for--.

Column 1, line 51, after "hydroxide" delete "to" and insert --is--.

Column 3, line 49, after "diameter." delete "in" and insert --In--.

Column 5, line 20, delete "separate" and insert --separation--.

Column 5, line 20, delete "processes" and insert --processed--.

Column 5, line 62, delete "chloritein" and insert --chlorite in--.

Column 9, line 19, delete "components" and insert --compounds--.

UNITED STATES PATENT AND TRADEMARK OFFICE
CERTIFICATE OF CORRECTION

PATENT NO. : 4,196,184

DATED : April 1, 1980

INVENTOR(S) : Walter J. Sakowski

It is certified that error appears in the above-identified patent and that said Letters Patent are hereby corrected as shown below:

Column 11, line 32, after "$H_2O$" delete "tm".

Column 12, line 17, after "the" insert --water--.

Column 16, Claim 1, line 37, delete "of" and insert --in--.

Signed and Sealed this

Eighth Day of July 1980

[SEAL]

Attest:

SIDNEY A. DIAMOND

Attesting Officer

Commissioner of Patents and Trademarks